W. V. TURNER.
BRAKE VALVE DEVICE.
APPLICATION FILED NOV. 6, 1913.
1,133,339.
Patented Mar. 30, 1915.
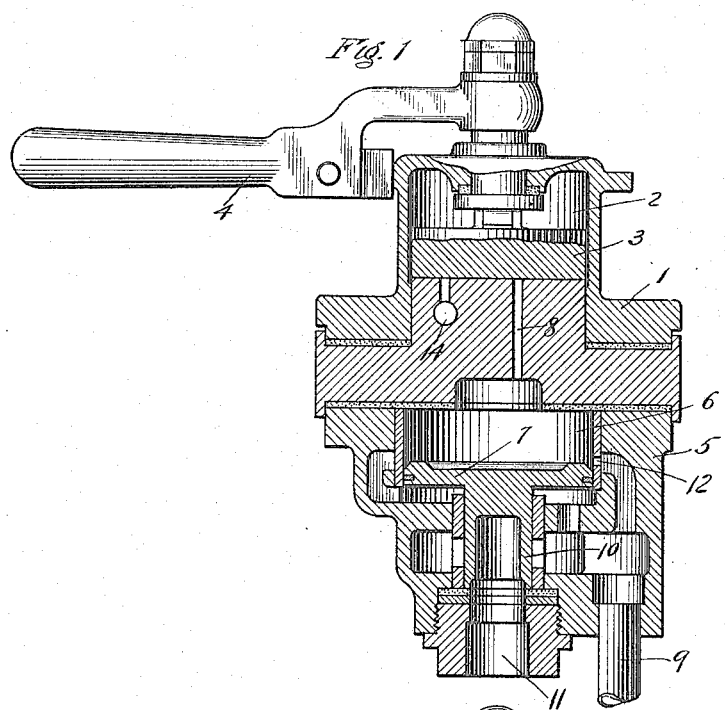
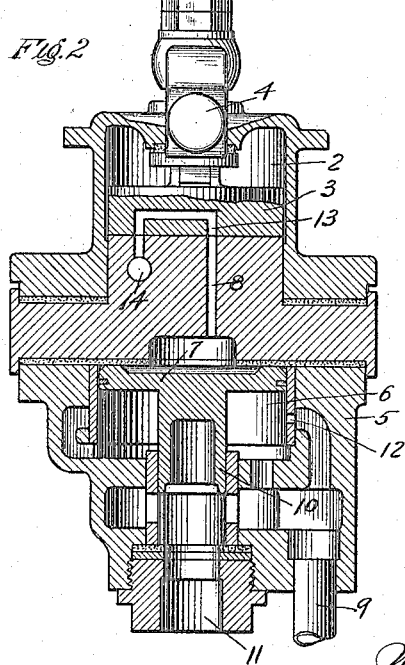
WITNESSES
INVENTOR
Walter V. Turner
by Wm. M. Cady
Att'y.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-VALVE DEVICE.

1,133,339.      Specification of Letters Patent.      Patented Mar. 30, 1915.

Application filed November 6, 1913. Serial No. 799,441.

*To all whom it may concern:*

Be it known that I, WALTER V. TURNER, a citizen of the United States, residing at Edgewood, in the county of Allegheny and State of Pennsylvania, have invented new and useful Improvements in Brake-Valve Devices, of which the following is a specification.

This invention relates to fluid pressure brakes, and more particularly to valve means for effecting reductions in brake pipe pressure.

With the usual standard brake valve, in emergency application position, a direct communication is opened from the brake pipe to the atmosphere in order to effect a sudden reduction in brake pipe pressure and while ordinarily, the vent hole in the brake valve is of sufficient size to vent the brake pipe with the desired rapidity, in some cases, especially on modern traction cars where there is considerable piping open to the brake pipe, the brake pipe volume is so large that the venting of fluid from the brake pipe in emergency may not be of the desired suddenness and rapidity. This might be remedied, of course, by providing larger emergency vent port openings in the brake valve, but this would necessitate the employment of a larger brake valve and the consequent replacement of the present brake valve.

The principal object of my invention is to provide means for securing a rapid and sudden venting of fluid from the brake pipe in emergency, where the brake pipe volume is large, while retaining the use of the usual brake valve having the usual size emergency vent ports.

In the accompanying drawing; Figue 1 is a central sectional view of a brake valve device with my improvement applied thereto, and showing the parts in release position; and Fig. 2 a similar view, showing the parts in emergency application position.

The brake valve proper may be of the usual standard construction comprising a casing 1 having a valve chamber 2 containing rotary valve 3 adapted to be operated by brake valve handle 4.

According to my invention, a vent valve mechanism is provided which may comprise a casing 5 adapted to be applied to the brake valve casing as shown in the drawing or connected up as a separate device in the brake pipe connection to the brake valve. Within the casing 5 is a piston chamber 6 containing a piston 7, the space above the piston being open to a passage 8, leading to the seat of the rotary valve 3 and the space below the piston being open to the brake pipe 9. The piston 7 operates a vent valve 10 for controlling the venting of fluid from the brake pipe to a large atmospheric exhaust port 11. Normally the valve 10 is seated and the piston 7 is in its lower position in which a port 12 is opened from the chamber above the piston to the brake pipe 9, and when the brake valve is in charging position, fluid is supplied through the passage 8 and the port 12 to the brake pipe, charging the brake pipe in the usual manner. The piston 7 is thus held in its lower position seating the valve 10 by the pressure in chamber 6 above the piston.

In making a service reduction in brake pipe pressure, fluid flows from the brake pipe through the port 12 to the brake valve and since said port is made greater in area than the service port of the brake valve, fluid is exhausted from the brake pipe as fast as it exhausts through the service port of the brake valve, so that the fluid pressures on opposite sides of the piston 7 remain equal and the piston is not shifted to open the valve 10.

In emergency position of the brake valve, as shown in Fig. 2 of the drawing, the passage 8 is connected by cavity 13 in the brake valve with exhaust port 14 and as the emergency port of the brake valve is of much larger capacity than the service port, the pressure in chamber 6 above the piston is reduced more rapidly than it can be supplied through the port 12, so that a differential of pressure is built up on the under side of the piston and the same is operated to lift the vent valve 10 from its seat and thereby open the large exhaust port 11 to the brake pipe. When the brakes are released, fluid supplied by the brake valve to chamber 6 shifts the piston 7 to open the port 12 and seat the vent valve 10. By this means, a sudden and rapid venting of fluid from the brake pipe in an emergency application is effected, while employing the usual brake valve device having the ordinary size emergency vent port.

Having now described my invention, what

I claim as new and desire to secure by Letters Patent, is:—

1. In a fluid pressure brake, the combination with a brake valve device and a brake pipe, of a valve mechanism associated with the brake valve device and adapted to control communication through which the fluid flows from the brake pipe to the brake valve in service and operated by brake pipe pressure upon movement of the brake valve to emergency position for opening a large vent port to the brake pipe.

2. In a fluid pressure brake, the combination with a brake pipe and a brake valve device controlling a port for venting fluid from the brake pipe at a service rate, of a valve mechanism operated by brake pipe pressure acting on one side thereof upon a predetermined reduction in pressure on the other side produced by the brake valve in emergency position for opening a large vent port to the brake pipe.

3. In a fluid pressure brake, the combination with a brake valve device and a brake pipe, of a piston subject on one side to brake pipe pressure, a restricted port adapted to permit flow of fluid from the brake pipe to the brake valve at the service rate, and a vent valve operated by said piston upon a rate of flow to the brake valve exceeding the service rate for opening a large vent port to the brake pipe.

4. In a fluid pressure brake, the combination with a brake valve device and a brake pipe, of a piston subject to the flow of fluid from the brake pipe to the brake valve in making a reduction in brake pipe pressure, a restricted port for permitting a service rate of flow, and a valve operated by said piston when the rate of flow from the brake pipe to the brake valve exceeds the service rate for opening a large vent port to the brake pipe.

In testimony whereof I have hereunto set my hand.

WALTER V. TURNER.

Witnesses:
A. M. CLEMENTS,
HOWARD J. BRUSH.

Copies of this patent may be obtained for five cents each, by addressing the " Commissioner of Patents, Washington, D. C."